United States Patent

[11] 3,592,550

| [72] | Inventor | Calvin J. Christmann<br>Mt. Clemens, Mich. |
|---|---|---|
| [21] | Appl. No. | 740,214 |
| [22] | Filed | June 26, 1968 |
| [45] | Patented | July 13, 1971 |
| [73] | Assignee | LTV Aerospace Corporation<br>Dallas, Tex. |

[54] OPTICAL TRACKING SYSTEM
4 Claims, 2 Drawing Figs.

| [52] | U.S. Cl. | 356/152, 356/141 |
|---|---|---|
| [51] | Int. Cl. | G01b 11/26 |
| [50] | Field of Search | 356/141, 152 |

[56] References Cited
UNITED STATES PATENTS

| 3,470,377 | 9/1969 | Le Pebre | 356/152 X |
| 3,341,707 | 9/1967 | Wingfield | 356/152 X |
| 2,806,402 | 9/1957 | Ferris | 356/152 |

Primary Examiner—Rodney D. Bennett, Jr.
Assistant Examiner—Joseph G. Baxter
Attorney—Henry C. Goldwire ABSTRACT: A target acquisition and tracking system including an image converter tube with optical means for receiving light from a target area and creating an image on the tube's photocathode, a plurality of light-transmitting fibers arranged to receive light from the tube's phosphor screen and means to sense the light level from these fibers to in turn control tube deflection.

CALVIN J. CHRISTMANN
INVENTOR

BY Robert M. Sperry
ATTORNEY

OPTICAL TRACKING SYSTEM

This invention relates to tracking devices and is particularly directed to optical means for "locking on" to and tracking a target.

In the arts of gunnery, missile guidance, and the like, some means must be provided for "locking on" to, or acquiring and tracking a target. Numerous devices have been proposed heretofore for accomplishing these purposes. However, none of the prior art devices have been entirely satisfactory. Many of the previously proposed systems have been extremely bulky and heavy. Other prior art systems have been complex and delicate, thus requiring substantial maintenance and repair. Still other prior art systems have been complicated to operate and have required extensive training of operating personnel.

These disadvantages of the prior art are overcome with the present invention and an optical tracking system is provided which is compact and light in weight, is simple and rugged in construction, requires little or no maintenance, and which may be operated by personnel having no special training.

The advantages of the present invention are preferably attained by providing means for focusing light from a target area to form an image on the photocathode of an image converter tube, focusing the electrons emitted by the photocathode to form an image on the phosphor screen of the image converter tube, disposing a plurality of light-transmitting fibers with one end of each of the fibers cooperating with the corresponding ends of adjacent fibers to define a reticle extending diametrically across the phosphor screen of the image converter tube and oriented to receive light emitted by the phosphor screen, coupling the opposite ends of selected groups of the fibers to transmit light to respective electro-optic transducers to means for controlling the positioning of the image on the phosphor screen of the image converter tube, and providing means to permit an operator to view the image on the phosphor screen of the image converter tube.

Accordingly, it is an object of the present invention to provide improved means for target acquisition and tracking.

Another object of the present invention is to provide improved means for target acquisition and tracking which is compact, light weight, simple and rugged in construction, and requires little or no maintenance.

A further object of the present invention is to provide improved means for target acquisition and tracking which may be operated by personnel having no special training.

These and other objects and features of the present invention will be apparent from the following detailed description taken with reference to the figures of the accompanying drawing.

Figure 1:
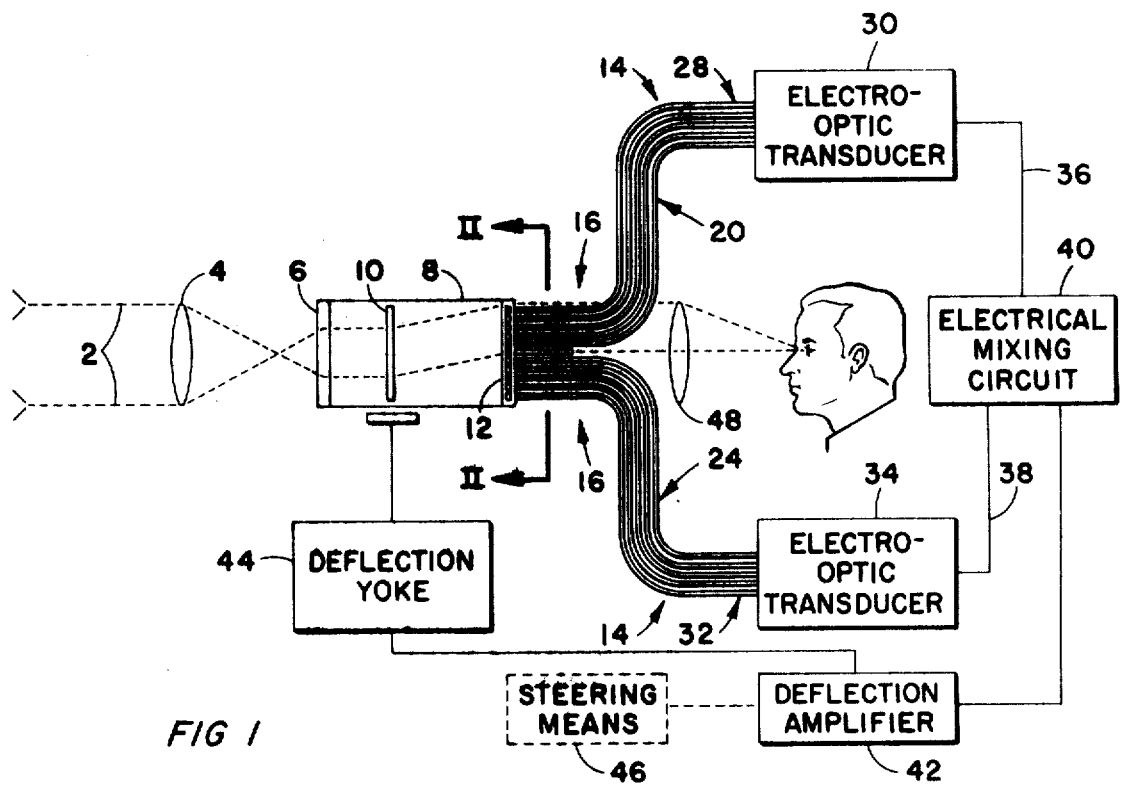
FIG. 1 is a diagrammatic representation of apparatus embodying the present invention for target acquisition and tracking.

In that form of the present invention chosen for purposes of illustration in the drawing, FIG. 1 shows target acquisition and tracking means wherein light from a target area, indicated by dashed lines 2, is focused by suitable entrance optics means, such as lens 4, to form an image of the target area on the photocathode 6 of an image converter tube 8. Photoelectrons emitted by the photocathode 6 are focused by anode ring 10 or the like to form an electronic image on the phosphor screen 12 of the image converter tube 8. A plurality of optical fibers or "light pipes," indicated generally at 14 in FIG. 1, are arranged on side-by-side relationship and each of the optical fibers has one end 16 thereof optically coupled to the phosphor screen 12 of the image converter tube 8 and cooperating with the corresponding ends of adjacent optical fibers to form a reticle extending diametrically across the phosphor screen 12, as indicated at 18 in FIG. 2. The reticle 18 is formed of four branches, as indicated at 20, 22, 24, and 26 in FIG. 2. The optical fibers of branch 20 each have one end 28 thereof optically coupled to electro-optic transducer 30; while the optical fibers of branch 24 each have one end 32 thereof optically coupled to electro-optic transducer 34. In the same way, the optical fibers of branches 22 and 26 are optically coupled to respective electro-optic transducers, not shown. The electro-optic transducers comprise photomultiplier tubes, solid state devices or the like which serve to convert light signals into electrical signals. The outputs of all of the electro-optic transducers are applied, as by conductors 36 and 38, to an electrical mixing circuit 40. The mixing circuit 40 compares the signals from transducer 30 with those from transducer 34 to establish a "vertical error" signal, referenced to the plane of the drawing of FIG. 2 and compares the signals from two similar transducers, not shown, to establish a "horizontal error" signal. These "error" signals are passed from the mixing circuit 40 to a deflection amplifier 42 which amplifies the signals and applies them to a deflection yoke 44. The deflection yoke 44 converts the electrical energy from the deflection amplifier 42 to a magnetic field. The deflection yoke 44 and the magnetic field (not shown) set upon the anode ring 10 to move the photoelectron image within the image converter tube 8 to center the image on the phosphor screen 12 with respect to the reticle 18 formed by the optical fibers 14. In a similar fashion, but for the purpose of automatic target acquisition, the entire reticle 18 may initially be employed for search and acquisition with a wide field of view of the phosphor screen 12. The reticle 18 may also later be used to provide a restricted view of the phosphor screen 12 rejecting all but the target picture, by inactivating certain ends of the optical fibers 14 from each pair 28 and 32 by an electro-optical means. The limited view of the target on the phosphor screen 12 will then provide most accurate position signals. In such a manner the device may be made to provide for both automatic target acquisition and tracking when used with the proper support systems. If desired, the device of the present invention may be employed for missile guidance by also applying the signals from deflection amplifier 42 to suitable steering means 46. Optics 48 are provided to permit the operator to view the phosphor screen 12.

Figure 2:
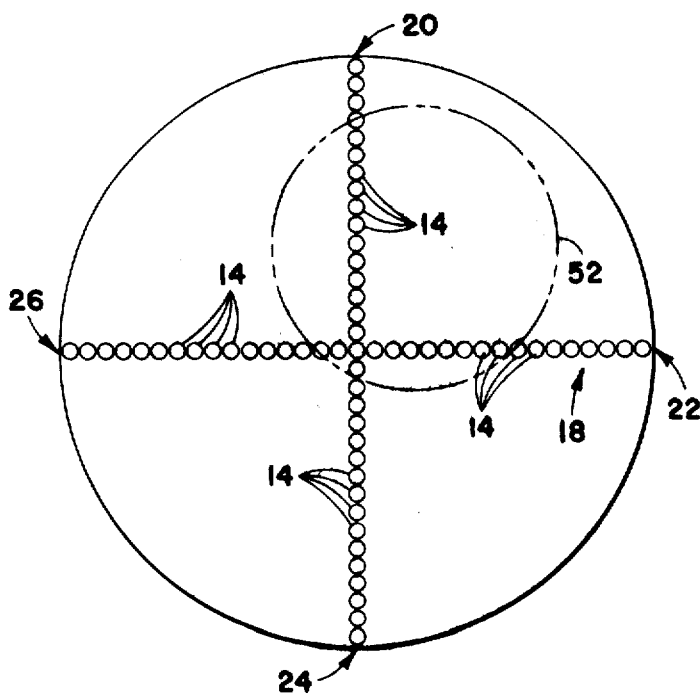
FIG. 2 is a diagrammatic representation of the phosphor screen of the image converter tube of the apparatus of FIG. 1, looking in the direction of the arrows II-II FIG. 1.

In operation, light 2 from the target area is focused by lens 4 to form an image on the photocathode 6 of image converter tube 8. The light 2 may be reflected light resulting from illumination of the target area by either natural or artificial means or, where the target area includes a source of light, such as a fire or floodlight, the light 2 may be direct light from such source. The light 2 focused by lens 4 on the photocathode 6 of the image converter tube 8 causes the photocathode 6 to emit photoelectrons which are focused by focus anode 10 to form an image on the phosphor screen 12 of the image converter tube 8. The phosphor screen 12 reconverts the electron image into a light image which is applied to the optical fibers 14 and which may also be viewed by the operator through suitable optics 48. As indicated above, the optical fibers 14 are arranged to form a reticle 18, composed of four branches 20, 22, 24, and 26 extending across the phosphor screen 12. Consequently, the operator, looking through the viewing optics 48, will see the phosphor screen 12 and reticle 18, substantially as seen in FIG. 2. Assuming that the target area is slightly off-axis with respect to the apparatus of the present invention, the light 2 from the target area will be focused by lens 4 to form an image slightly off center of the photocathode 6 of image converter tube 8 and the photoelectrons emitted by photocathode 6 will form an image which is correspondingly off center of the phosphor screen 12, as indicated by dashed lines at 52 in FIG. 2. It will be seen that, as shown, the image 52 is applied to a greater number of the optical fibers 14 of branch 20 than of branch 24. Accordingly, the quantity of light applied by the optical fibers 14 of branch 20 to electro-optic transducer 30 will be greater than the quantity of light applied by the optical fibers 14 of branch 24 to electro-optic transducer 34. In view of this, the signal supplied to the mixing circuit 40 by transducer 30 will be correspondingly greater than the signal supplied by transducer 34. Mixing circuit 40 compares these signals and derives an "UP" error signal which is amplified by deflection amplifier 42 and is applied to deflection yoke 44 to cause magnetic deflection of the electron image within converter tube 8 to deflect the beam of photoelectrons and, hence, the image 52 on phosphor screen 12, downward. In a similar manner electrostatic deflection may be used. In the same manner, image 52 is incident on a greater number of the optical fibers 14 of branch 22 of the reticle 18 than of branch 26. Mixing circuit 40 compares the signals resulting from this and derives a "RIGHT" error signal which is amplified by deflection amplifier 42 and is applied through deflection yoke 44 to cause deflection plates 10 to deflect the beam of photoelectrons and the image 52 on phosphor screen 12 to the left. When the image 52 is centered with respect to the reticle 18, the signals resulting from branches 20, 22, 24, and 26 will be equal and the output of mixing circuit 40 will be zero. Obviously, if the target moves with respect to the apparatus of the present invention, the target image will be displaced from the center of the reticle 18. When this occurs, the apparatus of the present invention will automatically generate appropriate error signals to recenter the target image. Thus, the device of the present invention will automatically "lock on" and track a target so long as the target is within the field-of-view provided by the entrance optics 4. It will be apparent to those skilled in the art that the entrance optics 4 may include suitable filters or the like to cause the device of the present invention to respond to desired characteristics, such as wavelength, of the light 2 from the target area.

For manual acquisition and tracking, the operator observes the phosphor screen 12 of the image converter tube 8 and the reticle 18 through the viewing optics 48 to obtain a view substantially as shown in FIG. 2 and can reposition the apparatus manually to maintain the target image 52 centered with respect to the reticle 18.

Obviously, numerous variations and modifications may be made without departing from the present invention. Accordingly, it should be clearly understood that the form of the invention described above and shown in the figures of the accompanying drawing is illustrative only and is not intended to limit the scope of the present invention

What I claim is:

1. Target acquisition and tracking means comprising:
    an image-converter tube having a photocathode, a phosphor screen, and deflecting means for deflecting electrons passing from said photocathode to said screen;
    entrance optics means for receiving light from a target area and focusing said light to form an image on said photocathode;
    a plurality of light-transmitting fibers arranged in side-by-side relation across said phosphor screen, each of said fibers having one end coupled to receive light from said phosphor screen;
    a plurality of electro-optic transducers, each coupled to receive light from the free ends of a respective group of said light-transmitting fibers and operative to emit electrical signals indicative of the light received;
    means connected to receive and compare the signals from said transducers and operative to establish an output signal indicative of the difference between the signals from said transducers; and
    means for applying said output signal to the deflecting means of said image-converter tube to cause desired deflection of electrons passing through said image-converter tube.

2. The apparatus of claim 1 wherein:
    said light-transmitting fibers are disposed in symmetrical groups arranged to define an adjustable reticle extending across said phosphor screen with adjustable field of view.

3. The apparatus of claim 1 further comprising:
    viewing optics positioned to permit an operator to view said phosphor screen.

4. The apparatus of claim 2 further comprising:
    viewing optics positioned to permit an operator to view said phosphor screen and said reticle.